(12) United States Patent
Kim et al.

(10) Patent No.: US 9,226,116 B2
(45) Date of Patent: Dec. 29, 2015

(54) METHOD AND APPARATUS FOR MANAGING CONFIGURATION INFORMATION OF MULTICAST AND BROADCAST SERVICE

(75) Inventors: Eunkyung Kim, Daejeon (KR); Jae Sun Cha, Daejeon (KR); Soojung Jung, Daejeon (KR); Sung Cheol Chang, Daejeon (KR); Hyun Lee, Daejeon (KR); Chul Sik Yoon, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 484 days.

(21) Appl. No.: 13/582,707

(22) PCT Filed: Mar. 4, 2011

(86) PCT No.: PCT/KR2011/001527
§ 371 (c)(1),
(2), (4) Date: Sep. 4, 2012

(87) PCT Pub. No.: WO2011/108894
PCT Pub. Date: Sep. 9, 2011

(65) Prior Publication Data
US 2012/0327935 A1    Dec. 27, 2012

(30) Foreign Application Priority Data

Mar. 4, 2010   (KR) .................. 10-2010-0019602
Mar. 17, 2010  (KR) .................. 10-2010-0023716
Mar. 4, 2011   (KR) .................. 10-2011-0019597

(51) Int. Cl.
H04W 72/04      (2009.01)
H04W 4/06       (2009.01)
H04W 4/00       (2009.01)

(52) U.S. Cl.
CPC ............. *H04W 4/06* (2013.01); *H04W 4/001* (2013.01)

(58) Field of Classification Search
CPC . H04W 72/005; H04W 72/04; H04W 72/042; H04W 48/10; H04W 76/048; H04W 76/002; H04W 52/0216; H04W 4/06; H04W 72/121; H04W 72/1289; H04W 4/12; H04L 65/4076; H04L 65/4084; H04L 5/0053; H04L 5/0048
See application file for complete search history.

(56) References Cited

U.S. PATENT DOCUMENTS 8,145,270 B2 * 3/2012 Cho et al. .......... 455/559
8,467,333 B2 * 6/2013 Lohmar et al. ..... 370/328

(Continued)

FOREIGN PATENT DOCUMENTS

JP    2009-089388 A    4/2009
KR    10-2009-0054207 A    5/2009
KR    10-2010-0009446 A    1/2010

OTHER PUBLICATIONS

Kaushik Josiam et al., "Proposed changes on the E-MBS-CFG message format (16.9.3.1)", IEEE C802.16m-10/0013r1, Jan. 14, 2010.

(Continued)

*Primary Examiner* — Wutchung Chu
(74) *Attorney, Agent, or Firm* — Rabin & Berdo, P.C.

(57) ABSTRACT

For managing MBS configuration information, a terminal decodes an MBS configuration message including configuration information for an MBS operation and a lifetime, and then decodes an MBS configuration message that is transmitted at a time that the lifetime indicates.

16 Claims, 4 Drawing Sheets

| ATTRIBUTE | VALUE/DESCRIPTION |
|---|---|
| LIFETIME (m) | - DURATION DURING WHICH MBS CONFIGURATION INFORMATION DOES NOT CHANGE<br>- TERMINAL SHALL DECODE MBS-CFG WHEN $N_{superframe}$ SATIFIES THE FOLLOWING CONDITION<br>$N_{superframe}$ modulo $16(m+1)==0$ |
| MBS Zone ID | MBS ZONE ID TO WHICH MBS MAP APPLIES |
| MBS MAP Resource Index | RESOURCE INDEX REPRESENTING LOCATION AND ALLOCATION SIZE OF RESOURCE |
| MBS MAP $I_{SizeOffset}$ | OFFSET USED TO COMPUTE BURST SIZE OF MBS MAP |
| Neighbor MBS Zone ID | NEIGHBOR MBS ZONE ID |
| Current MBS ID and FID and New MBS ID and FID | MAPPING OF CURRENT MBS ID AND FID AND NEW MBS ID AND FID BETWEEN SERVING MBS ZONE AND NEIGHBOR MBS ZONE |

(56) References Cited

U.S. PATENT DOCUMENTS

| | | | |
|---|---|---|---|
| 8,717,982 B2* | 5/2014 | Josiam et al. | 370/329 |
| 2004/0227618 A1* | 11/2004 | Hwang et al. | 340/7.46 |
| 2008/0123570 A1* | 5/2008 | Yin | 370/280 |
| 2008/0170557 A1* | 7/2008 | Yin | 370/343 |
| 2009/0086670 A1 | 4/2009 | Hart et al. | |
| 2009/0109890 A1* | 4/2009 | Chow et al. | 370/312 |
| 2009/0135779 A1 | 5/2009 | Moon et al. | |
| 2009/0168683 A1* | 7/2009 | Franceschini et al. | 370/312 |
| 2010/0014462 A1 | 1/2010 | Son et al. | |
| 2010/0177675 A1* | 7/2010 | Ai | 370/312 |
| 2010/0202371 A1* | 8/2010 | Josiam et al. | 370/329 |
| 2010/0202396 A1* | 8/2010 | Won et al. | 370/329 |
| 2011/0007683 A1* | 1/2011 | Kim et al. | 370/312 |
| 2011/0103289 A1* | 5/2011 | Josiam et al. | 370/312 |

OTHER PUBLICATIONS

Eunkyung Kim et al., "Proposed Text on the E-MBS MAP Structure (16.3.6)", IEEE C802.16m-09/2930r2, Jan. 14, 2010.

Chun-Yen Wang et al., "Proposed Text about AAI-E-MBS_CFG Message Format (15.9.3.1)" IEEE C802.16m-09/2638r1, Nov. 13, 2009.

* cited by examiner

Figure 3

| ATTRIBUTE | VALUE/DESCRIPTION |
|---|---|
| LIFETIME (m) | - DURATION DURING WHICH MBS CONFIGURATION INFORMATION DOES NOT CHANGE<br>- TERMINAL SHALL DECODE MBS-CFG WHEN $N_{superframe}$ SATIFIES THE FOLLOWING CONDITION $N_{superframe}$ modulo $16(m+1)==0$ |
| MBS Zone ID | MBS ZONE ID TO WHICH MBS MAP APPLIES |
| MBS MAP Resource Index | RESOURCE INDEX REPRESENTING LOCATION AND ALLOCATION SIZE OF RESOURCE |
| MBS MAP $I_{SizeOffset}$ | OFFSET USED TO COMPUTE BURST SIZE OF MBS MAP |
| Neighbor MBS Zone ID | NEIGHBOR MBS ZONE ID |
| Current MBS ID and FID and New MBS ID and FID | MAPPING OF CURRENT MBS ID AND FID AND NEW MBS ID AND FID BETWEEN SERVING MBS ZONE AND NEIGHBOR MBS ZONE |

Figure 4

| ATTRIBUTE | VALUE/DESCRIPTION |
|---|---|
| Number of MBS ID + FID | NUMBER OF MBS STREAMS |
| MBS ID + FID | MBS ID + FID OF MBS STREAM |
| $I_{SizeOffset}$ | OFFSET USED TO COMPUTE SIZE OF MBS DATA BURST |
| MBS subframe offset | INDEX OF SUBFRAME WHERE MBS DATA BURST ENDS |
| MBS resource index | POSITION OF RESOURCE INDEX WHERE MBS DATA BURST ENDS |

METHOD AND APPARATUS FOR MANAGING CONFIGURATION INFORMATION OF MULTICAST AND BROADCAST SERVICE

TECHNICAL FIELD

The present invention relates to an apparatus and a method for managing configuration information of a multicast and broadcast service (MBS).

BACKGROUND ART

The MBS is a point-to-multipoint transmission scheme for concurrent transport of data packets from a source to a plurality of destinations. A broadcast service is a service where data packets are transmitted to all users, and a multicast service is a service where data packets are transmitted to users belonging to a specific group.

A terminal receives an MBS configuration message from a base station, and acquires information on an MBS MAP. The terminal receives and decodes the MBS MAP representing information on MBS burst data based on the information on the MBS MAP. The terminal acquires information on bursts corresponding to MBS contents based on the MBS MAP, and receives and decodes the bursts.

The MBS configuration message has a lifetime, and does not change during the lifetime. Accordingly, when the lifetime expires and the MBS configuration message changes, the terminal should receive the MBS configuration message again. In the case that the MBS configuration message does not change when the lifetime expires, the terminal maintains information of the MBS configuration message with the stored values. Further, the terminal resets the lifetime to an initial value, and a timer restarts. The MBS MAP provides information on whether the MBS configuration message changes or not.

Whenever the MBS configuration message is transmitted, it is transmitted with the counted down value of the previous lifetime. Accordingly, the terminal cannot acquire an exact lifetime in accordance with a time when the terminal joins the MBS. In this case, if the lifetime expires and any information of the MBS configuration message does not change, the terminal cannot reset the lifetime to the exact value when resetting the lifetime.

DISCLOSURE

Technical Problem

Aspects of the present invention provide a method and an apparatus for managing MBS configuration information for correctly acquiring an MBS configuration message.

Technical Solution

According to an aspect of the present invention, a method of managing MBS configuration information in a terminal is provided. The method includes decoding an MBS configuration message including configuration information for an MBS operation and a lifetime, and decoding an MBS configuration message that is transmitted at a time that the lifetime indicates.

The MBS configuration message may be transmitted in a cycle of N superframes, and the time that the lifetime indicates may be a superframe satisfying a condition of $[N_{superframe}$ modulo $(N \times (m+1))] = N \times (m+1) - n$. Here, $N_{superframe}$ is a superframe number, m is the lifetime, and n is equal to or more than 0 and is less than N.

N may be 32, and n may be 1.

The terminal may not decode an MBS configuration message that is transmitted before the time that the lifetime indicates to the terminal.

The configuration information may include information on an MBS MAP, and the MBS MAP may include information on an MBS data burst.

According to another aspect of the present invention, a method of managing MBS configuration information in a base station is provided. The method includes periodically transmitting an MBS configuration message including configuration information for an MBS operation and a lifetime, and providing an MBS in accordance with the MBS configuration message. The lifetime indicates a time when the terminal decodes an MBS configuration message.

After the terminal decodes the MBS configuration message, the terminal may not decode an MBS configuration message that is transmitted before the time that the lifetime indicates.

The method may further include resetting a value of the lifetime after time indicated by the lifetime.

An MBS configuration information managing method of a terminal according to yet another aspect of the present invention includes moving across a cell boundary, and decoding an MBS configuration message that is transmitted when moving across the cell boundary. The MBS configuration message includes configuration information for an MBS operation.

The method may further include decoding an MBS configuration message that is transmitted at a time that a lifetime indicates. The MBS configuration message may further include the lifetime.

The terminal may not decode an MBS configuration message that is transmitted before the time that the lifetime indicates.

According to a further aspect of the present invention, an apparatus for managing MBS configuration information in a terminal is provided. The apparatus includes a decoder configured to decode an MBS configuration message including configuration information for an MBS operation and a lifetime, and a controller configured to decode an MBS configuration message that is transmitted at a time that the lifetime indicates.

The controller may control for the decoder to not decode an MBS configuration message that is transmitted before the time that the lifetime indicates.

The controller may control for the decoder to decode an MBS configuration message that is transmitted when the terminal moves across a cell boundary.

Advantageous Effects

According to an embodiment of the present invention, a terminal can receive and decode an MBS-CFG message again at a time that a lifetime indicates by using the fixed lifetime regardless of when the terminal joins an MBS.

According to another embodiment of the present invention, even if MBS configuration information is different between cells, a terminal can acquire MBS configuration information of a corresponding cell, thereby correctly receiving an MBS of the corresponding cell.

DESCRIPTION OF THE DRAWINGS

FIG. 3 is a drawing showing an MBS-CFG message according to an embodiment of the present invention.

FIG. 4 is a drawing showing an MBS MAP according to an embodiment of the present invention.

MODE FOR INVENTION

Figure 1:
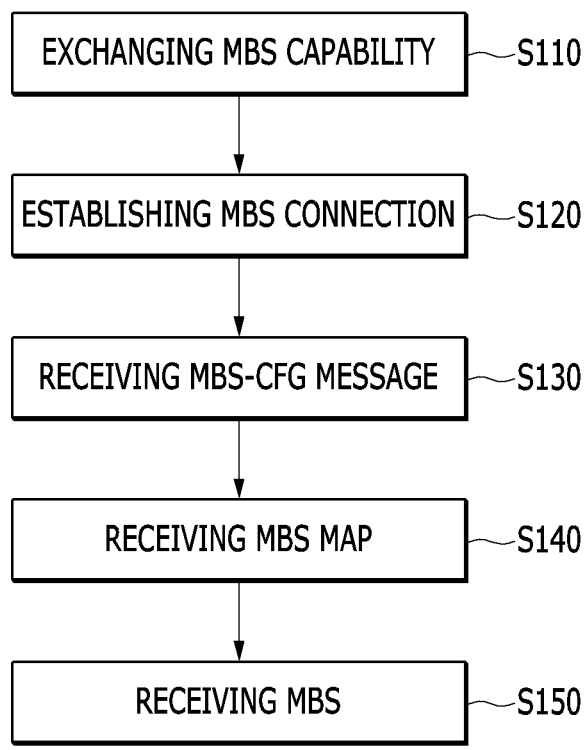
FIG. 1 is a schematic flowchart showing an MBS supporting method according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, the term terminal may designate a mobile terminal (MT), a mobile station (MS), a subscriber station (SS), a portable subscriber station (PSS), an access terminal (AT), user equipment (UE), and so on, or may include all or some functions thereof.

Further, the term base station (BS) may designate a node B, an evolved node B (eNodeB), an access point (AP), a radio access station (RAS), a base transceiver station (BTS), an MMR (mobile multihop relay)-BS, and so on, or may include all or some functions thereof.

FIG. 1 is a schematic flowchart showing an MBS supporting method according to an embodiment of the present invention.

Referring to FIG. 1, a terminal transmits information on MBS modes supported by the terminal to a base station, and the base station transmits information on MBS modes that are supported by the base station among the MBS modes supported by the terminal, to the terminal (S110). MBS capability is exchanged between the base station and the terminal through this process. The terminal may transmit MBS mode information through a registration request (REG-REQ) message for requesting registration of network entry or network re-entry. The base station may transmit MBS mode information through a registration response (REG-RSP) message to a REG-REQ message.

Next, the base station transmits a connection establishment request message for establishing MBS connection to the terminal, and the terminal transmits a response message thereto to the base station (S120). A dynamic service addition request (DSA-REQ) message may be used as the connection establishment request message, and a dynamic service addition response (DSA-RSP) message may be used as the response message to the connection establishment request message. Meanwhile, the MBS connection establishment request may be initiated by the terminal. In this case, the terminal may transmit the DSA-REQ message to the base station, and the base station may transmit the DSA-RSP message to the terminal.

Next, for an MBS operation, the terminal receives an MBS configuration (MBS-CFG) message transmitted from the base station, and acquires MBS configuration information (S130). The terminal acquires information on an MBS MAP based on the MBS configuration information (S140), and receives the MBS MAP from the base station based on the information on the MBS MAP, thereby receiving the MBS (S150).

Hereinafter, a method for managing MBS configuration information according to an embodiment of the present invention will be described with reference to FIG. 2 to FIG. 4.

Figure 2:
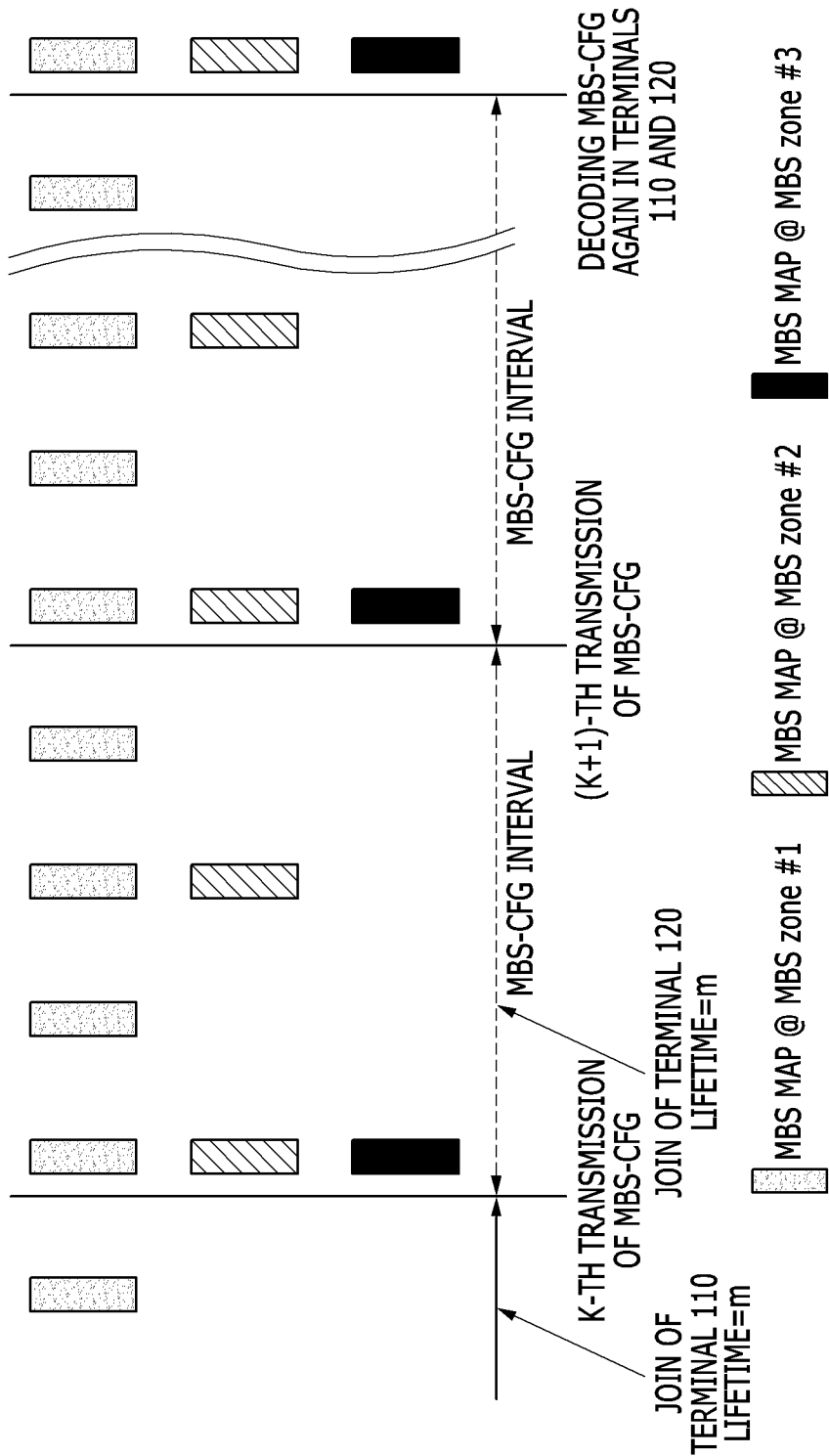
FIG. 2 and FIG. 5 are drawings showing a method for managing MBS configuration information according to an embodiment of the present invention, respectively.

FIG. 2 is a drawing showing a method for managing MBS configuration information according to an embodiment of the present invention, FIG. 3 is a drawing showing an MBS-CFG message according to an embodiment of the present invention, and FIG. 4 is a drawing showing an MBS MAP according to an embodiment of the present invention.

Referring to FIG. 2, a base station transmits an MBS-CFG message every certain interval. For example, the base station may transmit the MBS-CFG message in a cycle of 32 superframes, and may particularly transmit at a superframe when its superframe number $N_{superframe}$ satisfies a condition of Equation 1. That is, the base station may transmit the MBS-CFG message at a previous superframe of a time when the superframe number is a multiple of 32. Here, one superframe may include a plurality of frames, for example 4 frames. Meanwhile, when the base station transmits the MBS-CFG message in a cycle of N superframes, Equation 1 may be expressed as Equation 2.

$$N_{superframe} \text{ modulo } 32 == 31 \qquad \text{[Equation 1]}$$

$$N_{superframe} \text{ modulo } N == (N-1) \qquad \text{[Equation 2]}$$

Referring to FIG. 3, the MBS-CFG message includes, as the MBS configuration information, an MBS zone identifier (ID), resource information on an MBS MAP applied to the MBS Zone ID, burst size information on the MBS MAP, a neighbor MBS Zone ID, and mapping information of current MBS ID and flow ID (FID) and new MBS ID and FID between a serving MBS zone and a neighbor MBS zone, for each MBS zone. The resource information on the MBS MAP may be a resource index (MBS MAP Resource Index) representing a location and an allocation size of MBS MAP resources. The burst size information on the MBS MAP may be an offset (MBS MAP $I_{SizeOffset}$) used to compute a burst size of the MBS MAP. The MBS ID is an identifier that is allocated to the terminal for receiving the MBS. The FID is an identifier allocated to an MBS connection, and is used along with a corresponding MBS ID. The MBS-CFG message further includes a lifetime that represents a duration in which the MBS configuration information does not change. The lifetime indicates when the terminal receives and decodes the MBS-CFG message, and does not count down.

Referring to FIG. 2 again, the terminal decodes the MBS-CFG message to acquire information on the MBS MAP of the MBS zone to which it belongs, and receives the MBS MAP. The terminal does not decode the MBS-CFG message again before a time that the lifetime of the decoded MBS-CFG message indicates, and receives and decodes an MBS-CFG message at the time.

Since the lifetime of the MBS-CFG message indicates when a new MBS-CFG message is decoded, a terminal 110 that joins the MBS before a k-th transmission of the MBS-CFG message and a terminal 120 that joins the MBS after the k-th transmission of the MBS-CFG message acquire the same lifetime. Terminals 110 and 120 do not decode the MBS-CFG message before a time that the lifetime indicates, but they receive and decode the MBS-CFG message at the corresponding time. In detail, when the lifetime of the MBS-CFG message is 'm', the terminals 110 and 120 decode the MBS-CFG message again when a superframe number $N_{superframe}$ satisfies a condition of Equation 3. That is, the terminal can acquire the time that the lifetime indicates by lower bits but not higher bits exceeding 32(m+1) in the superframe number $N_{superframe}$.

$$N_{superframe} \text{ modulo } (32\times(m+1))==32\times(m+1)-1 \quad \text{[Equation 3]}$$

Meanwhile, in the case that the base station transmits the MBS-CFG message in a cycle of N superframes, Equation 3 may be expressed as Equation 4. Further, in the case that the base station transmits the MBS-CFG message at a superframe that precedes a time when the superframe number is a multiple of 'N' by n superframes, Equation 3 may be expressed as Equation 5.

$$N_{superframe} \text{ modulo } (N\times(m+1))==N\times(m+1)-1 \quad \text{[Equation 4]}$$

$$N_{superframe} \text{ modulo } (N\times m+1)==N\times(m+1)-n \quad \text{[Equation 5]}$$

Here, n is equal to or more than 0, and N is an integer less than N.

After the time indicated by the lifetime, the base station may reset a value (m) of the lifetime of the MBS-CFG message.

Referring to FIG. 4, an MBS MAP includes information on a MBS data burst. In detail, the MBS MAP includes the number of MBS streams, an MBS stream identifier, size information of the MBS data burst, MBS multi-input multi-output (MIMO) mode information, and position information of the MBS data burst. Since the MBS stream may be defined as a pair of an MBS ID and an FID, the number of MBS streams may be represented as the number of pairs of MBS ID and FID (number of MBS ID+FID), and the MBS stream identifier may be represented as the pair of MBS ID and FID (MBS ID+FID). The size information of MBS data burst may be an offset used to compute the size of the MBS data burst. The position information of the MBS data burst may include an offset (MBS subframe offset) representing an index of a subframe where the MBS data burst ends and a location (MBS resource index) of a resource index where the MBS data burst ends.

According to another embodiment, the MBS MAP may further include an MBS configuration (MBS-CFG) change indication representing whether a next MBS-CFG message changes or not. When the MBS-CFG change indication represents a change of the MBS configuration, the terminal may receive the next MBS-CFG message.

As described above, according to an embodiment of the present invention, the terminals 110 and 120 can receive and decode the MBS-CFG message again at a time that the lifetime indicates, by using the fixed lifetime regardless of when the terminals join the MBS.

Figure 5:
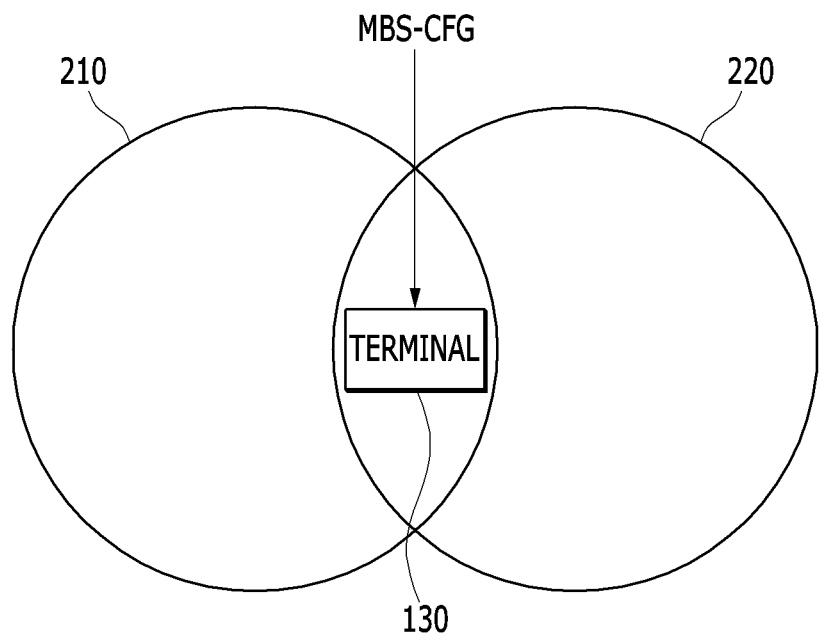

FIG. 5 is a drawing showing a method for managing MBS configuration information according to another embodiment of the present invention.

Referring to FIG. 5, when a terminal 130 moves across cell boundary by moving from one cell 210 to another cell 220, the terminal 130 always receives and decodes an MBS-CFG message regardless of a lifetime of the MBS-CFG message. Even if MBS configuration information is different between cells, the terminal 130 can acquire the MBS configuration information of a corresponding cell, thereby correctly receiving an MBS of the corresponding cell.

Next, an MBS configuration information managing apparatus for performing an MBS configuration information managing method according to an embodiment of the present invention will be described with reference to FIG. 6.

Figure 6:
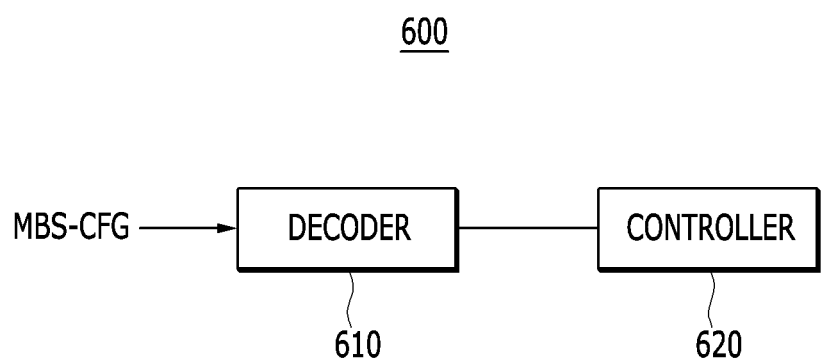
FIG. 6 is a schematic block diagram of an MBS configuration information managing apparatus according to an embodiment of the present invention.

FIG. 6 is a schematic block diagram of an MBS configuration information managing apparatus according to an embodiment of the present invention.

Referring to FIG. 6, an MBS configuration information managing apparatus 600 of a terminal includes a decoder 610 and a controller 620.

The decoder 610 receives and decodes an MBS-CFG message transmitted from a base station, and the controller 620 controls for the decoder 610 to decode an MBS-CFG message transmitted at a time that a lifetime of the MBS-CFG message indicates. Further, the controller 620 controls for the decoder 610 to decode an MBS-CFG message transmitted when the terminal moves across a cell boundary.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

The invention claimed is:

1. A method of managing configuration information of a multicast and broadcast service (MBS) in a terminal, the method comprising:

decoding an MBS configuration message including configuration information for an MBS operation and a lifetime; and decoding an MBS configuration message that is transmitted at a time that the lifetime indicates;

wherein the MBS configuration message is transmitted in a cycle of N superframes, and the time that the lifetime indicates is a superframe satisfying a condition of $$[N_{superframe} \text{ modulo} (N\times(m+1))==N\times(m+1)-n],$$

wherein $N_{superframe}$ is a superframe number m is the lifetime and n is equal to or more than 0 and is less than N.

2. The method of claim 1, wherein N is 32 and n is 1.

3. The method of claim 1, wherein the terminal does not decode an MBS configuration message that is transmitted before the time that the lifetime indicates.

4. The method of claim 1, wherein the configuration information includes information on an MBS MAP, and the MBS MAP includes information on an MBS data burst.

5. A method of managing configuration information of a multicast and broadcast service (MBS) in a base station, the method comprising:

periodically transmitting an MBS configuration message including configuration information for an MBS operation and a lifetime; and providing an MBS in accordance with the MBS configuration message, wherein the lifetime indicates a time when the terminal decodes an MBS configuration message, and wherein the MBS configuration message is transmitted in a cycle of N superframes, and the time that the lifetime indicates is a superframe satisfying a condition of $$[N_{superframe} \text{ modulo } (N\times(m+1))==N\times(m+1)-n],$$

wherein $N_{superframe}$ is a superframe number m is the lifetime and n is equal to or more than 0 and is less than N.

6. The method of claim 5, wherein N is 32 and n is 1.

7. The method of claim 5, wherein, after the terminal decodes the MBS configuration message, the terminal does not decode an MBS configuration message that is transmitted before the time that the lifetime indicates.

8. The method of claim 5, further comprising resetting a value of the lifetime after time indicated by the lifetime.

9. A method of managing configuration information of a multicast and broadcast service (MBS) in a terminal, the method comprising:
- moving across a cell boundary;
- decoding an MBS configuration message that is transmitted when moving across the cell boundary, the MBS configuration message including configuration information for an MBS operation; and
- decoding an MBS configuration message that is transmitted at a time that a lifetime indicates;
- wherein the MBS configuration message further includes the lifetime, and
- wherein the MBS configuration message is transmitted in a cycle of N superframes, and
- the time that the lifetime indicates a superframe satisfying a condition of $$[N_{superframe} \bmod (N \times (m+1)) = = N \times (m+1) - n],$$

wherein $N_{superframe}$ is a superframe number m is the lifetime and n is equal to or more than 0 and is less than N.

10. The method of claim 9, wherein N is 32 and n is 1.

11. The method of claim 9, wherein the terminal does not decode an MBS configuration message that is transmitted before the time that the lifetime indicates.

12. An apparatus for managing configuration information of a multicast and broadcast service (MBS) in a terminal, the apparatus comprising:
- a decoder configured to decode an MBS configuration message including configuration information for an MBS operation and a lifetime; and
- a controller configured to decode an MBS configuration message that is transmitted at a time that the lifetime indicates;
- wherein the MBS configuration message is transmitted in a cycle of N superframes, and
- the time that the lifetime indicates a superframe satisfying a condition of $$[N_{superframe} \bmod (N \times (m+1)) = = N \times (m+1) - n],$$

wherein $N_{superframe}$ is a superframe number m is the lifetime and n is equal to or more than 0 and is less than N.

13. The apparatus of claim 12, wherein N is 32 and n is 1.

14. The apparatus of claim 12, wherein the controller controls for the decoder to not decode an MBS configuration message that is transmitted before the time that the lifetime indicates.

15. The apparatus of claim 12, wherein the controller controls for the decoder to decode an MBS configuration message that is transmitted when the terminal moves across a cell boundary.

16. The apparatus of claim 12, wherein the configuration information includes information on an MBS MAP, and the MBS MAP includes information on an MBS data burst.

* * * * *